US012565206B2

(12) United States Patent
Kang

(10) Patent No.: US 12,565,206 B2
(45) Date of Patent: Mar. 3, 2026

(54) APPARATUS FOR DRIVING ASSISTANCE, AND METHOD FOR DRIVING ASSISTANCE

(71) Applicant: HL Klemove Corp., Incheon (KR)

(72) Inventor: Boryeon Kang, Seongnam-si (KR)

(73) Assignee: HL KlemoveCorp., Incheon (KR)

( * ) Notice: Subject to any disclaimer, the term of this patent is extended or adjusted under 35 U.S.C. 154(b) by 164 days.

(21) Appl. No.: 18/242,705

(22) Filed: Sep. 6, 2023

(65) Prior Publication Data

US 2024/0270247 A1 Aug. 15, 2024

(30) Foreign Application Priority Data

Feb. 14, 2023 (KR) ......................... 10-2023-0019570

(51) Int. Cl.
*B60W 30/16* (2020.01)
*B60W 30/18* (2012.01)

(52) U.S. Cl.
CPC ...... *B60W 30/16* (2013.01); *B60W 30/18009* (2013.01); *B60W 2552/10* (2020.02); *B60W 2552/30* (2020.02); *B60W 2552/53* (2020.02); *B60W 2554/4041* (2020.02); *B60W 2554/4044* (2020.02); *B60W 2554/4045* (2020.02); *B60W 2554/801* (2020.02); *B60W 2554/804* (2020.02); *B60W 2720/10* (2013.01)

(58) Field of Classification Search
CPC ........... B60W 30/16; B60W 30/18009; B60W 2552/10; B60W 2552/30; B60W 2552/53; B60W 2554/4041; B60W 2554/4044; B60W 2554/4045; B60W 2554/801;

B60W 2554/804; B60W 2720/10; B60W 2420/403; B60W 2420/408; B60W 2554/4042; B60W 2554/802; B60W 2554/806; B60W 30/162; B60W 40/107; B60W 30/08; B60W 40/02; B60W 2050/0005; B60W 2520/105; B60W 2554/803

See application file for complete search history.

(56) References Cited

U.S. PATENT DOCUMENTS

| | | | |
|---|---|---|---|
| 12,252,155 B2 * | 3/2025 | Oh .................... | B60W 60/0027 |
| 2018/0065623 A1 * | 3/2018 | Wodrich ............... | B60W 30/06 |
| 2019/0241184 A1 * | 8/2019 | Hayashi ................ | G08G 1/167 |
| 2020/0189592 A1 * | 6/2020 | Jang ..................... | B60W 30/18 |

(Continued)

FOREIGN PATENT DOCUMENTS

| | | | |
|---|---|---|---|
| JP | 3602337 B2 | 12/2004 | |
| KR | 10-2010-0056883 A | 5/2010 | |

(Continued)

*Primary Examiner* — Ashley L Redhead, Jr.
(74) *Attorney, Agent, or Firm* — Harvest IP Law, LLP

(57) ABSTRACT

Disclosed herein is a driving assistance system according to one embodiment including a memory in which a program for coping with a cut-in vehicle is stored, and a processor configured to execute the stored program, wherein the processor acquires information on a nearby vehicle and road lines near a vehicle, determines a position of the nearby vehicle from a travel lane of the vehicle based on the information on the nearby vehicle and the information on the road lines, and determines whether the nearby vehicle is the cut-in vehicle based on the position of the nearby vehicle from the travel lane of the vehicle.

17 Claims, 10 Drawing Sheets

(56)          References Cited

U.S. PATENT DOCUMENTS

2021/0192955 A1\*    6/2021    Kang ................... B60W 30/09
2022/0097697 A1\*    3/2022    Wang ................... B60W 50/14
2023/0015357 A1\*    1/2023    Kim ..................... G06V 10/751
2023/0294690 A1\*    9/2023    Kvieska ........... B60W 30/18009
                                                                     701/96
2024/0182028 A1\*    6/2024    Jang ................... B60W 30/143

FOREIGN PATENT DOCUMENTS

KR      10-2017-0133756 A      12/2017
KR      10-2021-0079946 A       6/2021

\* cited by examiner

< DETERMINATION OF CUT-IN INTENTION >

APPARATUS FOR DRIVING ASSISTANCE, AND METHOD FOR DRIVING ASSISTANCE

CROSS-REFERENCE TO RELATED APPLICATION

This application claims the benefit of Korean Patent Application No. 10-2023-0019570, filed on Feb. 14, 2023 in the Korean Intellectual Property Office, the disclosure of which is incorporated herein by reference.

BACKGROUND

1. Field

Embodiments of the present disclosure relate to an apparatus for driving assistance, and a method for driving assistance, which may perform speed control in response to a nearby vehicle that attempts to cut into a lane in which a vehicle is traveling.

2. Description of the Related Art

Recently, research on vehicles equipped with an advanced driver assistance system (ADAS) for actively providing information on a vehicle state, a driver state, or a surrounding environment in order to reduce a driver's burden and enhance convenience has been actively progressed.

For example, an ADAS mounted on vehicles may perform functions of lane departure warning (LDW), lane keeping assist (LKA), high beam assist (HBA), autonomous emergency braking (AEB), traffic sign recognition (TSR), adaptive cruise control (ACC), blind spot detection (BSD), etc.

SUMMARY

Therefore, it is an aspect of the present disclosure to provide an apparatus for driving assistance, and a method for driving assistance, which may determine whether a nearby vehicle cuts into a lane based on a position of the nearby vehicle from the lane in which a vehicle is traveling, thereby increasing the accuracy of determination of a cut-in vehicle and improving the reliability of the driving assistance system.

Additional aspects of the disclosure will be set forth in part in the description which follows and, in part, will be obvious from the description, or may be learned by practice of the disclosure.

In accordance with one aspect of the present disclosure, an apparatus for driving assistance includes a memory in which a program for coping with a cut-in vehicle is stored, and a processor configured to execute the stored program. The processor acquires information on a nearby vehicle and road lines near a vehicle, determines a position of the nearby vehicle from a travel lane of the vehicle based on the information on the nearby vehicle and the information on the road lines, and determines whether the nearby vehicle is the cut-in vehicle based on the position of the nearby vehicle from the travel lane of the vehicle.

The processor may determine the position of the nearby vehicle based on a distance between a first road line, which is positioned between the nearby vehicle and the vehicle, and the vehicle and a distance between the vehicle and the nearby vehicle.

The processor may determine a cut-in intention of the nearby vehicle based on the information on the nearby vehicle and the information on the road lines.

The processor may determine whether the nearby vehicle is the cut-in vehicle based on the position of the nearby vehicle from the travel lane of the vehicle when it is determined that the cut-in intention of the nearby vehicle is present.

The information on the nearby vehicle may include at least one of a longitudinal position of the nearby vehicle, a transverse position of the nearby vehicle, a length of the nearby vehicle, a width of the nearby vehicle, or a heading angle of the nearby vehicle.

The information on the road lines may include at least one of a deviation between a left road line and a right road line centered on the vehicle, a curvature of the lane, or a curvature rate of the lane.

The processor may determine that the nearby vehicle is the cut-in vehicle when a difference between the distance between the vehicle and the nearby vehicle and the distance between the first road line and the vehicle is smaller than a reference value.

The processor may calculate a required acceleration of the vehicle based on a relative speed of the nearby vehicle when it is determined that the nearby vehicle is the cut-in vehicle, and control a speed of the vehicle based on the calculated required acceleration.

In accordance with another aspect of the present disclosure, an apparatus for driving assistance includes a camera provided to detect road lines, a radar provided to detect a nearby vehicle, and a processor configured to execute a program stored in a memory. The processor acquires information on the nearby vehicle and information on the road lines, determines a position of the nearby vehicle from a travel lane of a vehicle based on the information on the nearby vehicle and the information on the road lines, and determines whether the nearby vehicle is a cut-in vehicle based on the position of the nearby vehicle from the travel lane of the vehicle.

In accordance with still another aspect of the present disclosure, a method for driving assistance includes acquiring information on a nearby vehicle and road lines near the vehicle, determining a position of the nearby vehicle from a travel lane of the vehicle based on the information on the nearby vehicle and the information on the road lines, and determining whether the nearby vehicle is a cut-in vehicle based on the position of the nearby vehicle from the travel lane of the vehicle.

The determining of the position of the nearby vehicle may include determining the position of the nearby vehicle based on a distance between a first road line, which is positioned between the nearby vehicle and the vehicle, and the vehicle and a distance between the vehicle and the nearby vehicle.

The determining of whether the nearby vehicle is the cut-in vehicle may include determining a cut-in intention of the nearby vehicle based on the information on the nearby vehicle and the information on the road lines.

The determining of whether the nearby vehicle is the cut-in vehicle may include determining whether the nearby vehicle is the cut-in vehicle based on the position of the nearby vehicle from the travel lane of the vehicle when it is determined that the cut-in intention of the nearby vehicle is present.

The determining of whether the nearby vehicle is the cut-in vehicle may include determining that the nearby vehicle is the cut-in vehicle when a difference between the distance between the vehicle and the nearby vehicle and the distance between the first road line and the vehicle is smaller than a reference value.

The method may further include calculating a required acceleration of the vehicle based on a relative speed of the nearby vehicle when it is determined that the nearby vehicle is the cut-in vehicle, and controlling a speed of the vehicle based on the calculated required acceleration.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
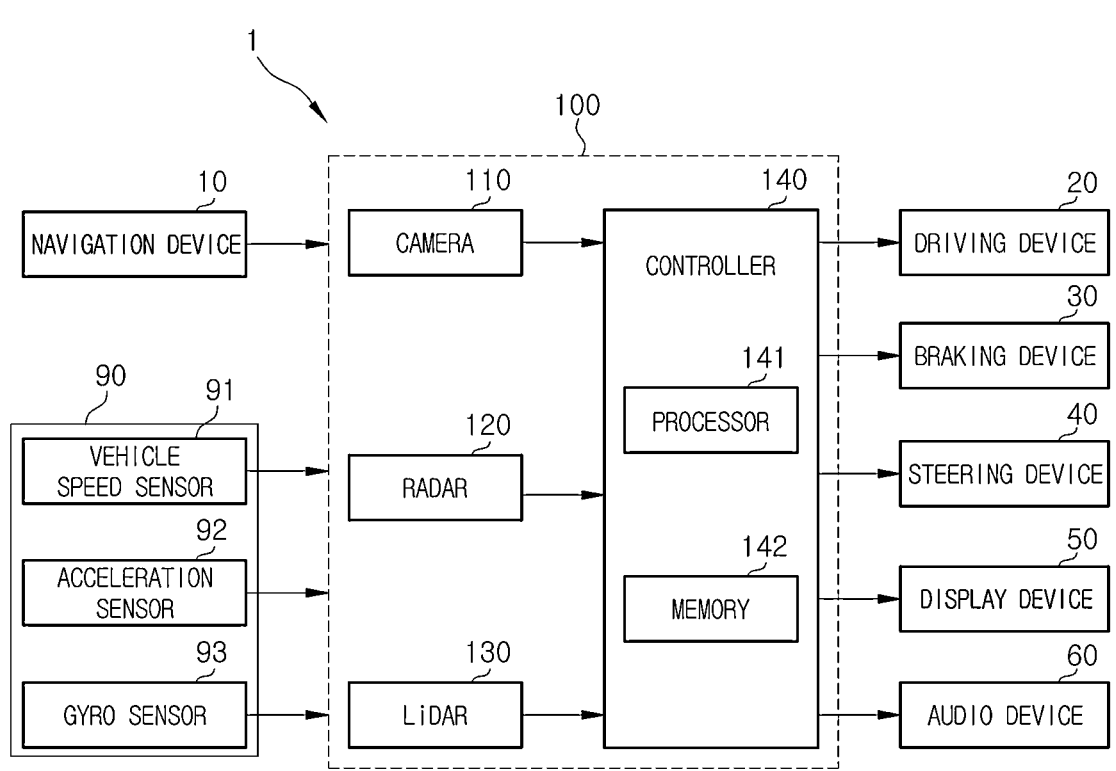
FIG. 1 is a block diagram illustrating operations of a vehicle and a driving assistance system included therein according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
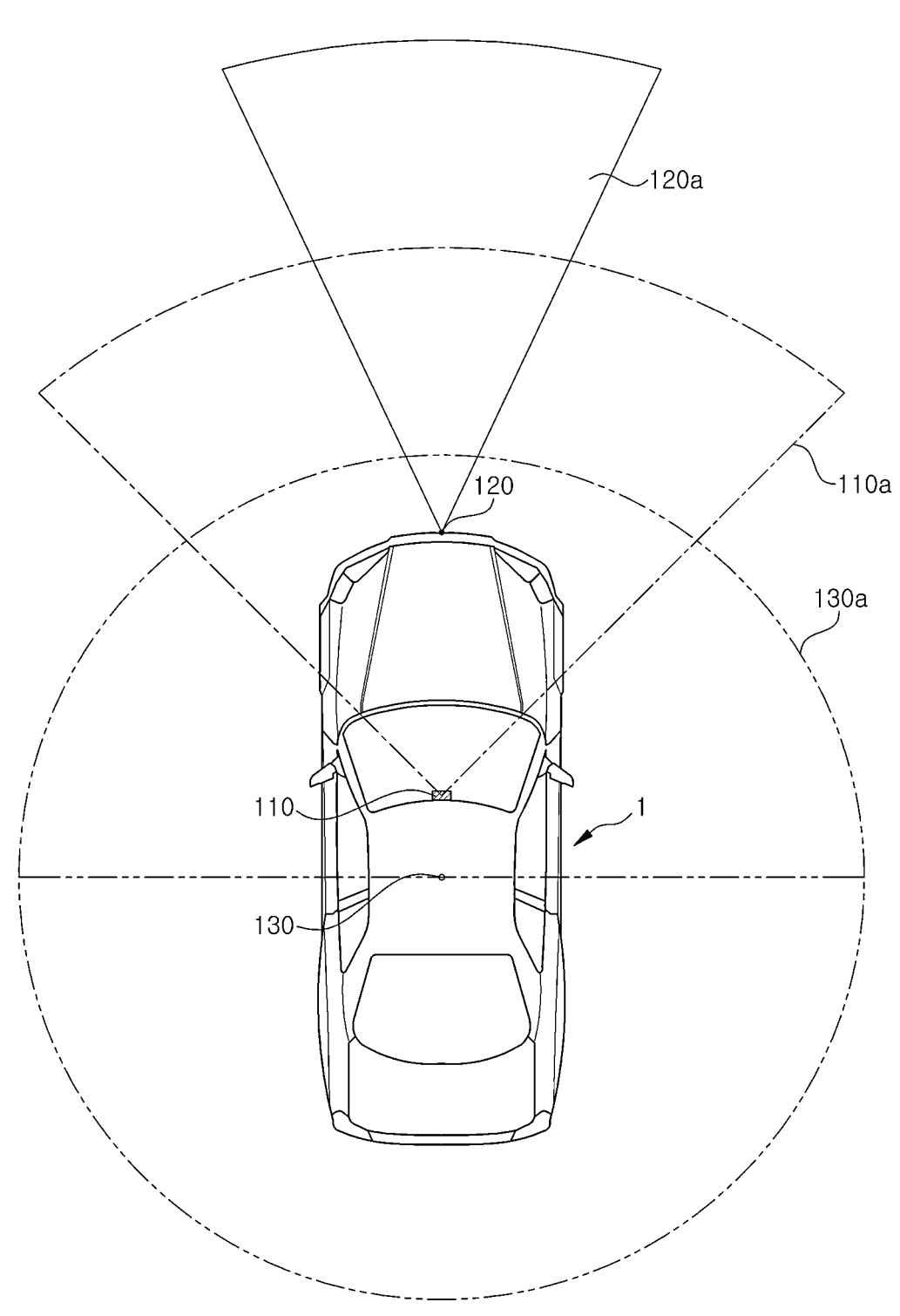
FIG. 2 is a view illustrating fields of view of a camera, a radar, and a light detection and ranging (LIDAR) included in the vehicle according to one embodiment.

FIG. 1 is a block diagram illustrating operations of a vehicle and a driving assistance system included therein according to one embodiment, and FIG. 2 is a view illustrating fields of view of a camera, a radar, and a light detection and ranging (LIDAR) included in the vehicle according to one embodiment.

As illustrated in FIG. 1, a vehicle 1 may include a navigation device 10, a driving device 20, a braking device 30, a steering device 40, a display device 50, an audio device 60, a behavior sensor 90, and a driving assistance system 100.

The navigation device 10 may generate a route to a destination input by a driver and provide the generated route to the driver. The navigation device 10 may receive Global Navigation Satellite System (GNSS) signals from a GNSS and identify an absolute position (coordinates) of the vehicle 1 based on the GNSS signals. The navigation device 10 may generate the route to the destination based on the position (coordinates) of the destination input by the driver and a current position (coordinates) of the vehicle 1.

The driving device 20 generates power required for moving the vehicle 1. The driving device 20 may include, for example, an engine, an engine management system (EMS), a transmission, and a transmission control unit (TCU).

The engine may generate power for the vehicle 1 to travel, and the EMS may control the engine in response to a driver's acceleration intention transmitted through an accelerator pedal or a request of the driving assistance system 100. The transmission may transmit the power generated by the engine to wheels for deceleration, and the TCU may control the transmission in response to a driver's transmission instruction transmitted through a transmission lever and/or a request of the driving assistance system 100.

Alternatively, the driving device 20 may include a driving motor, a reducer, a battery, a power control device, etc. In this case, the vehicle 1 may be implemented as an electric vehicle.

Alternatively, the driving device 20 may include both engine-related devices and driving motor-related devices. In this case, the vehicle 1 may be implemented as a hybrid electric vehicle.

The braking device 30 may decelerate the vehicle 1. For example, the braking device 30 may include a brake caliper and an electronic brake control module (EBCM). The brake caliper may decelerate the vehicle 1 or stop the vehicle 1 using friction with a brake disk.

The EBCM may control the brake caliper in response to a driver's braking intention transmitted through a brake pedal or a request of the driving assistance system 100. For example, the EBCM may receive a deceleration request including a deceleration from the driving assistance system 100 and electrically or hydraulically control the brake caliper so that the vehicle 1 decelerates based on the requested deceleration.

The steering device 40 may include an electronic power steering control module (EPS). The steering device 40 may change a traveling direction of the vehicle 1, and the EPS may assist with an operation of the steering device 40 so that the driver may easily manipulate a steering wheel in response to a driver's steering intention transmitted through the steering wheel.

In addition, the EPS may control the steering device 40 in response to a request of the driving assistance system 100. For example, the EPS may receive a steering request including a steering torque from the driving assistance system 100 and control the steering device 40 to steer the vehicle 1 based on the requested steering torque.

The display device 50 may include a cluster, a head-up display, a center fascia monitor, etc., and provide various pieces of information and entertainments to the driver through images. For example, the display device 50 may provide traveling information of the vehicle 1, a warning message, etc., to the driver.

The audio device 60 may include a plurality of speakers and provide various pieces of information and entertainments to the driver through sounds. For example, the audio device 60 may provide traveling information of the vehicle 1, a warning message, etc., to the driver.

The behavior sensor 90 may include at least one of a vehicle speed sensor 91 for detecting a speed of the vehicle 1, an acceleration sensor 92 for detecting a longitudinal acceleration and a transverse acceleration of the vehicle 1, or a gyro sensor 93 for detecting a yaw rate, a roll rate, and a pitch rate of the vehicle 1.

The above-described components may transmit or receive data through a vehicle communication network. For example, the above-described components included in the vehicle 1 may transmit or receive data via the vehicle communication network such as Ethernet, media oriented systems transport (MOST), Flexray, a controller area network (CAN), or a local interconnect network (LIN).

The driving assistance system 100 according to one embodiment may communicate with the navigation device 10, the driving device 20, the braking device 30, the steering device 40, the display device 50, and the audio device 60 via the vehicle communication network.

The driving assistance system 100 may use data received from other components of the vehicle 1 as a basis for recognition and determination and transmit control signals for controlling the vehicle 1 to the other components of the vehicle 1 based on the recognition and determination results.

The driving assistance system 100 may provide various functions for safety to the driver and furthermore, may also be used for autonomous driving of the vehicle 1. For example, the driving assistance system may provide functions of lane departure warning (LDW), lane keeping assist (LKA), high beam assist (HBA), autonomous emergency braking (AEB), traffic sign recognition (TSR), adaptive cruise control (ACC), blind spot detection (BSD), etc.

The driving assistance system 100 may include a controller 140, a camera 110, a radar 120, and a LIDAR 130 in order to perform the above-described functions.

The controller 140, the camera 110, the radar 120, and the LiDAR 130 may be provided to be physically separated from one another. For example, the controller 140 may be installed in a housing separated from a housing of the camera 110, a housing of the radar 120, and a housing of the LiDAR 130. The controller 140 may transmit or receive data with the camera 110, the radar 120, or the LiDAR 130 through a wide-bandwidth network.

Alternatively, at least some of the camera 110, the radar 120, the LiDAR 130, or the controller 140 may be integrally provided. For example, the camera 110 and the controller 140 may be provided in the same housing, the radar 120 and the controller 140 may be provided in the same housing, or the LiDAR 130 and the controller 140 may be provided in the same housing.

The camera 110 may capture surroundings of the vehicle 1 and acquire image data of the surroundings of the vehicle 1. For example, as illustrated in FIG. 2, the camera 110 may be installed on a front windshield of the vehicle 1 and may have a forward field of view 110*a* of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix.

The image data may include information on another vehicle, a pedestrian, a cyclist, or a road line (marker for distinguishing a lane) positioned near the vehicle 1.

The driving assistance system 100 may include a processor for processing the image data of the camera 110, and the processor may be, for example, a component included in the camera 110 or may be a component included in the controller 140.

The processor may acquire image data from an image sensor of the camera 110 and detect and identify nearby objects of the vehicle 1 based on a result of processing the image data. For example, the processor may generate tracks corresponding to nearby objects of the vehicle 1 by performing image processing and classify the generated tracks. The processor may identify whether the track is another vehicle, a pedestrian, or a cyclist, etc., and assign an identification code to the track.

The processor may transmit data (or positions and classifications of the tracks) on tracks (hereinafter referred to as "camera track") near the vehicle 1 to the controller 140. The controller 140 may perform a driver assistance function or a driving assistance function based on the camera track.

The radar 120 may transmit transmission radio waves toward the surroundings of the vehicle 1 and detect the nearby objects of the vehicle 1 based on reflected radio waves reflected from the nearby objects. For example, as illustrated in FIG. 2, the radar 120 may be installed on a grille or a bumper of the vehicle 1 and may have a forward field of sensing 120*a* of the vehicle 1.

The radar 120 may include a transmission antenna (or a transmission antenna array) for radiating transmission radio waves toward the surroundings of the vehicle 1 and a reception antenna (or a reception antenna array) for receiving reflection signals, that is, the reflected radio waves that return after being reflected from objects.

The radar 120 may acquire radar data from the transmission radio waves transmitted by the transmission antenna and the reflected radio waves received by the reception antenna. The radar data may include position information (e.g., distance information) or speed information of front objects of the vehicle 1.

The driving assistance system 100 may include a processor for processing the radar data, and the processor may be, for example, a component included in the radar 120 or may be a component included in the controller 140.

The processor may acquire the radar data from the reception antenna of the radar 120 and generate tracks corresponding to the objects by clustering reflection points of the reflection signal. The processor may, for example, acquire a distance of the track based on a time difference between a transmission time of the transmission radio wave and a reception time of the reflected radio wave and acquire a relative speed of the track based on a frequency difference between the transmission radio wave and the reflected radio wave.

The processor may transmit data (or the distances and relative speeds of the tracks) on the tracks (hereinafter referred to as "radar track") near the vehicle 1 acquired from the radar data to the controller 140. The controller 140 may perform a driver assistance function or a driving assistance function based on the radar track.

The LiDAR 130 may emit light (e.g., infrared rays) toward the surroundings of the vehicle 1 and detect nearby objects of the vehicle 1 based on reflected light reflected from the nearby objects. For example, as illustrated in FIG. 2, the LiDAR 130 may be installed on a roof of the vehicle 1 and may have a field of sensing 130*a* in all directions near the vehicle 1.

The LiDAR 130 may include a light source (e.g., a light emitting diode, a light emitting diode array, a laser diode, or a laser diode array) for emitting light (e.g., infrared rays) and an optical sensor (e.g., a photodiode or a photodiode array) for receiving light (e.g., infrared rays). In addition, as necessary, the LiDAR 130 may further include a driving device for rotating the light source or the optical sensor.

While the light source or the optical sensor rotates, the LiDAR 130 may emit light through the light source and receive the light reflected from objects through the optical sensor, thereby acquiring LiDAR data.

The LiDAR data may include relative positions (distances or directions of nearby objects) or relative speeds of the nearby objects of the vehicle 1.

The driving assistance system 100 may include a processor for processing the LiDAR data, and the processor may be, for example, a component included in the LiDAR 130 or may be a component included in the controller 140.

The processor may generate tracks corresponding to objects by clustering reflection points by the reflected light. The processor may, for example, acquire a distance to the object based on a time difference between a light transmission time and a light reception time. In addition, the processor may acquire a direction (or an angle) of the object with respect to a traveling direction of the vehicle 1 based on a direction in which the light source emits light when the optical sensor receives the reflected light.

The processor may transmit data (or the distances and relative speeds of the tracks) on the tracks (hereinafter referred to as "LiDAR track") near the vehicle 1 acquired from the LiDAR data to the controller 140.

The controller 140 may be implemented as at least one of an electronic control unit (ECU) or a domain control unit (DCU) electrically connected to the camera 110, the radar 120, or the LiDAR 130.

The controller 140 may process the camera track (or the image data) of the camera 110, the radar track (or the radar data) of the radar 120, or the LiDAR track (or the LiDAR data) of the LiDAR 130 and provide control signals to the driving device 20, the braking device 30, or the steering device 40.

Alternatively, the controller 140 may output a warning to a user through at least one of the display device 50 or the audio device 60 based on a result of processing the image data, the radar data, or the LiDAR data.

The controller 140 may include at least one memory 142 for storing a program for performing an operation to be described below, for example, a program for coping with a cut-in vehicle and at least one processor 141 for executing the stored program.

The memory 142 may store a program or data for processing the image data, the radar data, or the LiDAR data. In addition, the memory 142 may store programs or data for generating driving, braking, and steering signals.

The memory 142 may temporarily store the image data received from the camera 120, the radar data received from the radar 120, or the LiDAR data received from the LiDAR 130 and temporarily store a result of processing the image data, the radar data, or the LiDAR data of the processor 141.

In addition, the memory 142 may include a high definition (HD) map. Unlike general maps, the HD map may include detailed information on surfaces of roads or intersections, such as road lines, traffic lights, intersections, and traffic signs. In particular, landmarks (e.g., a road line, a traffic light, an intersection, and a traffic sign) that vehicles encounters while traveling are implemented in the form of a three dimension on the HD map.

The memory 142 may include not only volatile memories such as a static random access memory (SRAM) and a dynamic RAM (DRAM) but also non-volatile memories such as a flash memory, a read only memory (ROM), and an erasable programmable ROM (EPROM).

The processor 141 may process the camera track of the camera 120, the radar track of the radar 120, or the LiDAR track of the LiDAR 130. For example, the processor 141 may fuse the camera track, the radar track, or the LiDAR track and output fusion track.

Based on a result of processing the fusion track, the processor 141 may generate a driving signal, a braking signal, or a steering signal for respectively controlling the driving device 20, the braking device 30, or the steering device 40.

For example, the processor 141 may evaluate risk of collision between the fusion tracks and the vehicle 1. The processor 141 may control the driving device 20, the braking device 30, or the steering device 40 to steer or brake the vehicle 1 based on the risk of collision between the fusion tracks and the vehicle 1.

The processor 141 may include the image processor for processing the image data of the camera 110, the signal processor for processing the radar data of the radar 120, or the LiDAR data of the LiDAR 130, or a micro control unit (MCU) for generating driving, braking, and steering signals.

A detailed operation of the driving assistance system 100 will be described below in more detail.

In addition, although not illustrated in the drawings, a vehicle according to one embodiment may further include a communication module capable of communicating with other external devices. The communication module may wirelessly communicate with a base station or an access point (AP) and transmit or receive data with external devices via the base station or the AP.

For example, the communication module may wirelessly communicates with the AP using WiFi (WiFi™, IEEE 802.11 technical standard) or communicate with the base station using code division multiple access (CDMA), wideband CDMA (WCDMA), Global System for Mobiles (GSM), Long Term Evolution (LTE), fifth generation (5G), wireless broadband Internet (WiBro), etc.

In addition, the communication module may directly communicate with the external devices. For example, the communication module 70 may transmit or receive data with short-range external devices using WiFi Direct, Bluetooth (Bluetooth™, IEEE 802.15.1 technical standard), ZigBee (ZigBee™, IEEE 802.15.4 technical standard), etc.

Meanwhile, all of the components illustrated in FIG. 1 are not necessarily included in the vehicle 1. For example, at least one of the radar 120 or the LiDAR 130 may be omitted.

In addition, although the camera 110, the radar 120, and the LiDAR 130 are illustrated in the drawings as one component of the driving assistance system 100, it is not always necessary that these components be physically included in the driving assistance system 100.

Therefore, at least one of the camera 110, the radar 120, or the LiDAR 130 may be provided in the vehicle 1 as a component independent of the driving assistance system 100, and the driving assistance system 100 may acquire the image data or the camera track, the radar data or the radar track, or the LiDAR data or the LiDAR track from the at least one of the camera 110, the radar 120, or the LIDAR 130 provided in the vehicle 1.

Figure 3:
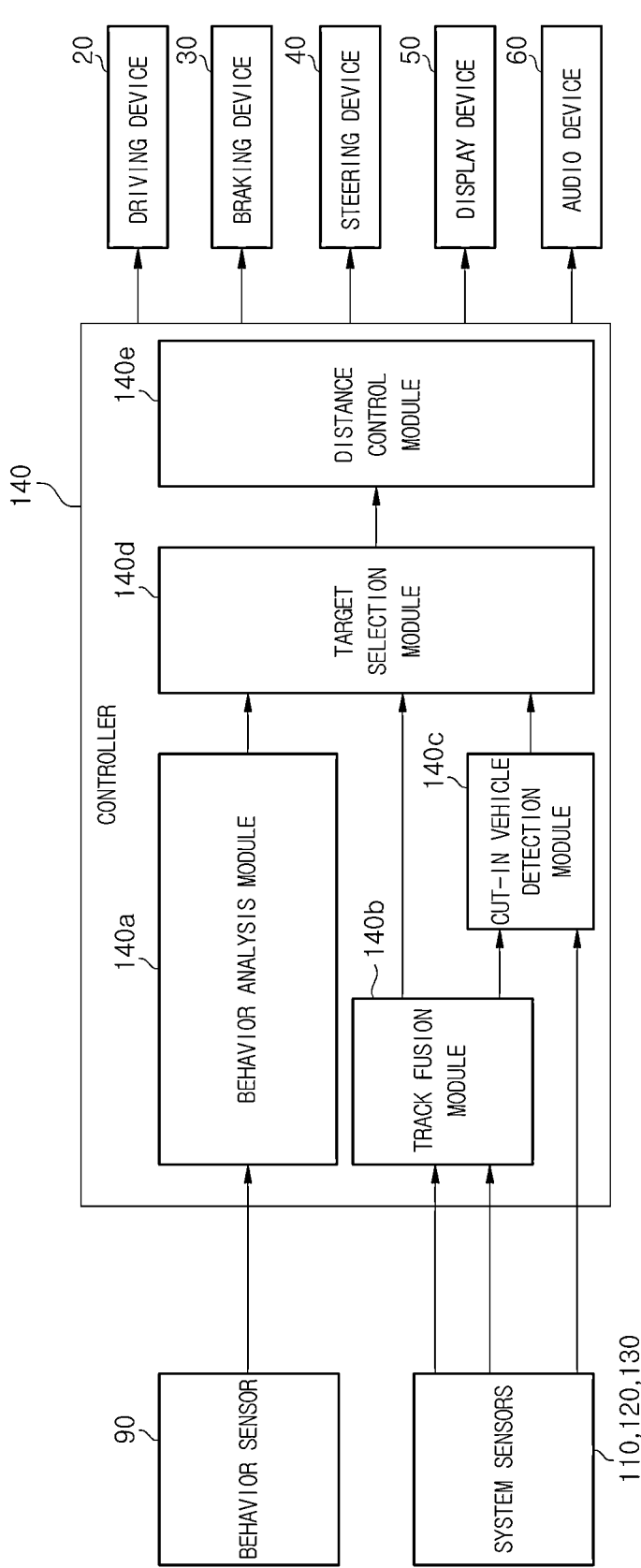
FIG. 3 is a block diagram illustrating operations performed by a controller of the driving assistance system according to one embodiment.
Figure 4:
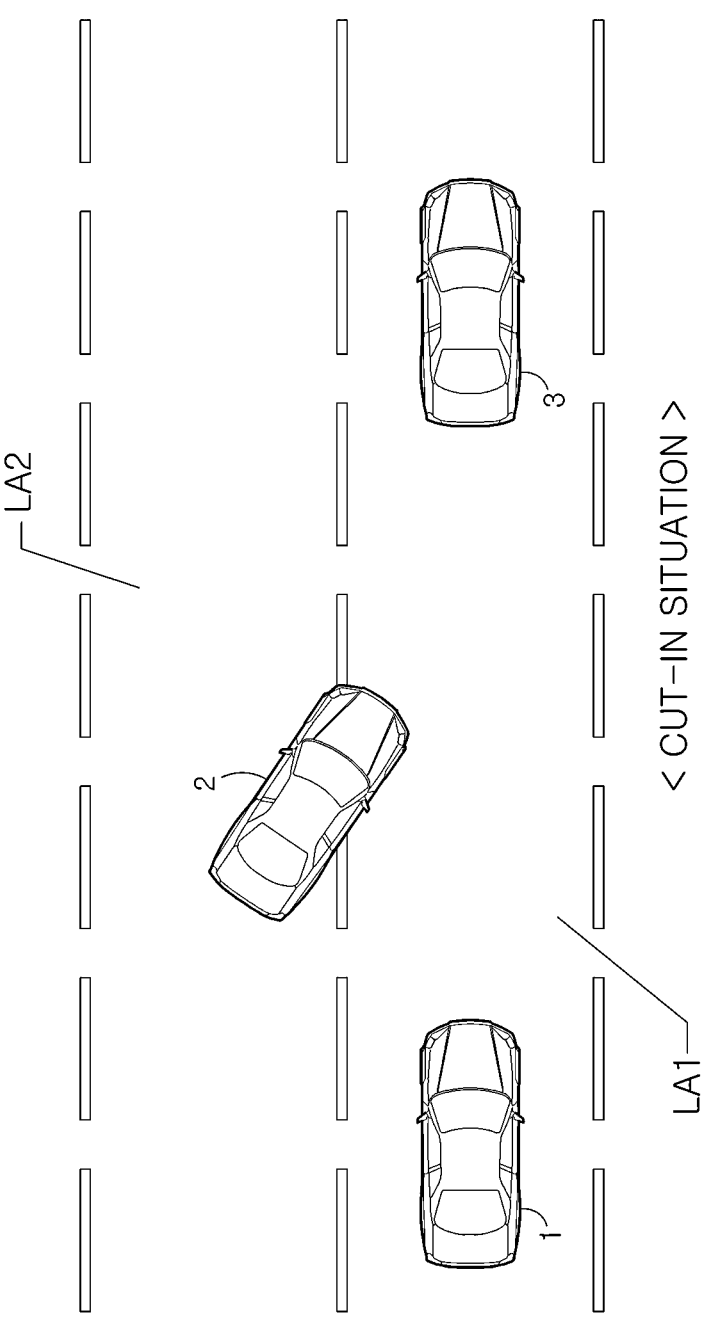
FIG. 4 is a view illustrating a cut-in situation of a nearby vehicle, which is one situation to which the driving assistance system needs to respond according to one embodiment.

FIG. 3 is a block diagram illustrating operations performed by a controller of the driving assistance system according to one embodiment, and FIG. 4 is a view illustrating a cut-in situation of a nearby vehicle, which is one situation to which the driving assistance needs to respond according to one embodiment.

Referring to FIG. 3, the controller 140 of the driving assistance system 100 according to one embodiment may include a behavior analysis module 140a, a track fusion module 140b, a cut-in vehicle detection module 140c, a target selection module 140d, and a distance control module 140e.

The behavior analysis module 140a may acquire various pieces of data related to a behavior of a vehicle from the behavior sensor 90. For example, the behavior analysis module 140a may acquire data such as a wheel speed, a longitudinal acceleration, a transverse acceleration, a yaw rate, a roll rate, or a pitch rate and analyze the behavior of the vehicle 1 based on the acquired data.

The track fusion module 140b may acquire the camera track, the radar track, or the LiDAR track from the system sensor such as the camera 110, the radar 120, or the LiDAR 130 and generate a fusion track by fusing two or more of the acquired tracks.

As described above, the driving assistance system 100 may perform an adaptive cruise control (ACC) function. In addition, since the driving assistance system 100 may perform autonomous driving, in both cases, the driving assistance system 100 may perform control for constantly maintaining an inter-vehicle distance with a preceding vehicle.

As illustrated in FIG. 4, while the vehicle 1 is traveling, a situation in which a nearby vehicle 2, which is traveling in a nearby lane LA2, changes the lane to a travel lane LA1 of the vehicle 1 to cut into a lane in the front of the vehicle 1, that is, a cut-in situation may occur.

When the driving assistance system may not quickly detect a cut-in vehicle, a braking timing of the vehicle may be delayed, resulting in collision with the cut-in vehicle. The driving assistance system 100 according to one embodiment can reduce risk of collision with the cut-in vehicle by quickly detecting the cut-in vehicle. Hereinafter, an operation of the driving assistance system 100 that detects the cut-in vehicle will be described in detail.

Referring back to FIG. 3, the controller 140 of the driving assistance system 100 may include the cut-in vehicle detection module 140c for quickly detecting the cut-in vehicle. The cut-in vehicle detection module 140c may acquire at least one of the camera track, the radar track, or the LiDAR track from the camera 110, the radar 120, or the LiDAR 130 and acquire a fusion result of two or more of the camera track, the radar track, or the LiDAR track from the track fusion module 140b.

In order to quickly detect the cut-in vehicle, the cut-in vehicle detection module 140c may determine whether the corresponding nearby vehicle is the cut-in vehicle based on a position of the nearby vehicle from the travel lane of the vehicle 1.

Outputs of the behavior analysis module 140a, the track fusion module 140b, and the cut-in vehicle detection module 140c may be input to the target selection module 140d. The target selection module 140d may select a target based on the behavior of the vehicle 1, a detection result or fusion result of the sensors 110, 120, and 130, a detection result of the cut-in vehicle, etc. Here, the selected target may be a distance control target of the vehicle 1.

The distance control module 140e may generate various control signals for controlling a distance between the vehicle 1 and the selected target. For example, the distance control module 140e may generate at least one of a driving signal, a braking signal, or a steering signal and transmit the signals to the driving device 20, the braking device 30, or the steering device 40.

In addition, the distance control module 140e may also generate a visual warning or an audible warning and transmit the visual warning or the audible warning to the display device 50 or the audio device 60.

Meanwhile, each of the modules illustrated in FIG. 3 is intended to represent operations performed by the controller 140 rather than representing physically independent components. Therefore, two or more of the behavior analysis module 140a, the track fusion module 140b, the cut-in vehicle detection module 140c, the target selection module 140d, and the distance control module 140e may share the same processor and memory.

Figure 5:
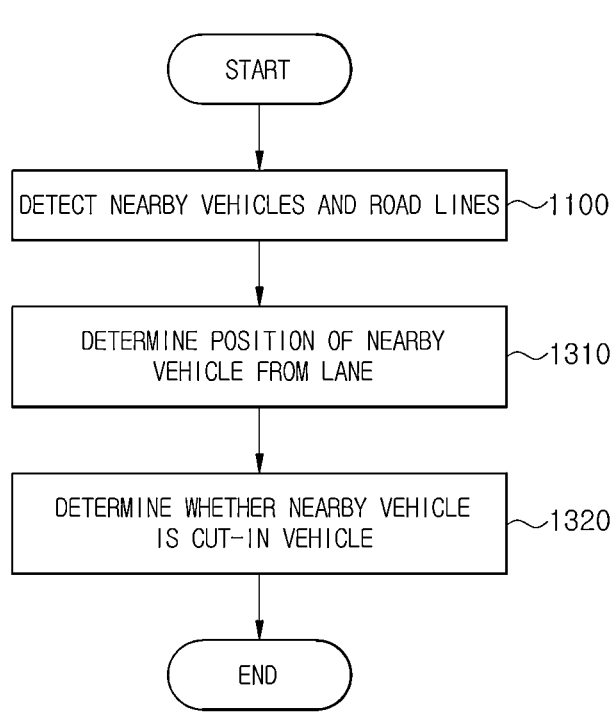
FIG. 5 is a flowchart illustrating a driving assistance method according to one embodiment.
Figure 6:
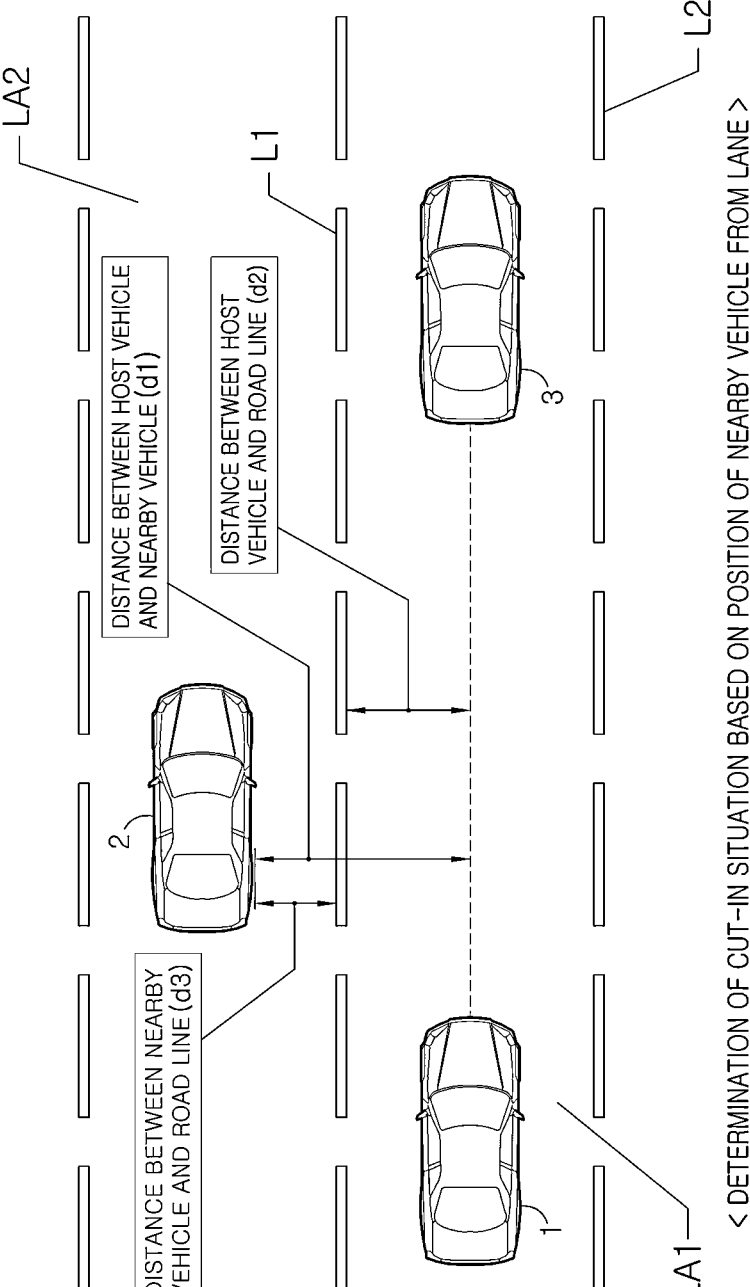
FIG. 6 is a view illustrating information recognized by the driving assistance method according to one embodiment.

FIG. 5 is a flowchart illustrating a driving assistance method according to one embodiment, and FIG. 6 is a view illustrating information recognized by the driving assistance method according to one embodiment.

A driving assistance method according to one embodiment may be performed by the driving assistance system 100 or the vehicle 1 including the same. Therefore, a description of the driving assistance system 100 or the vehicle 1 may also be applied to the embodiment of the driving assistance method in the same manner even when not otherwise mentioned. In addition, a description of the driving assistance method to be described below may also be applied to the driving assistance system 100 or the vehicle 1 in the same manner even when not otherwise mentioned.

As illustrated in FIG. 5, in the driving assistance method according to one embodiment, nearby vehicles and road lines are detected (1100).

The image data acquired by the camera 110, the radar data acquired by the radar 120, or the LiDAR data acquired by the LiDAR 130 may be used to detect the nearby vehicles and the road lines.

The detected nearby vehicles may include a preceding vehicle or a following vehicle that is traveling in the same lane as the travel lane of the vehicle 1 and a vehicle that is traveling in a nearby lane of the travel lane of the vehicle 1.

The detected road lines may include a left road line and a right road line constituting the lane in which the vehicle 1 is traveling.

The detection of the nearby vehicles and the road lines may be performed by the camera 110, the radar 120, or the LiDAR 130, and the camera 110, the radar 120, or the LiDAR 130 may output a result of detecting the nearby vehicles and the road lines to the controller 140.

Alternatively, the controller 140 may detect the nearby vehicles and the road lines based on the image data acquired by the camera 110, the radar data acquired by the radar 120, or the LiDAR data acquired by the LiDAR 130.

The controller 140 may determine positions of the nearby vehicles in the lane based on information on the nearby vehicles and information on the road lines (1310) and determine whether the nearby vehicle is the cut-in vehicle based on the position of the nearby vehicle in the lane (1320).

The information on the nearby vehicles may include information such as a longitudinal position of the nearby vehicle, a transverse position of the nearby vehicle, a length of the nearby vehicle, a width of the nearby vehicle, and a heading angle of the nearby vehicle.

The information on the road lines may include information such as a deviation between the left and right road lines constituting the lane, a curvature of the lane, a curvature rate of the lane, a heading angle of the nearby vehicle, and a view range of the camera 110.

The lane in which it is determined that the nearby vehicle is positioned may be the lane in which the vehicle 1 is traveling, that is, the travel lane of the vehicle 1. That is, according to the driving assistance method according to one embodiment, it is possible to determine whether the nearby vehicle is the cut-in vehicle based on the position of the nearby vehicle from the travel lane of the vehicle 1.

Since the information on the nearby vehicles and the information on the road lines may be acquired by a processor, the processor for acquiring the information may be a processor included in the camera 110, the radar 120, or the LIDAR 130 or may be the processor 141 included in the controller 140.

Referring to FIG. 6, when determining the position of the nearby vehicle from the travel lane of the vehicle 1, the controller 140 may use a distance d1 between the vehicle 1 and a nearby vehicle 2, a distance d2 between the vehicle 1 and a road line L1, and a distance d3 between the nearby vehicle 2 and the road line L1.

Here, the road line L1 may be a road line positioned between the vehicle 1 and the nearby vehicle 2, and in an embodiment to be described below, for convenience of description, the road line L1 between the nearby vehicle 2 and the vehicle 1 among the two road lines L1 and L2 constituting the travel lane is referred to as the first road line L1.

Figure 7:
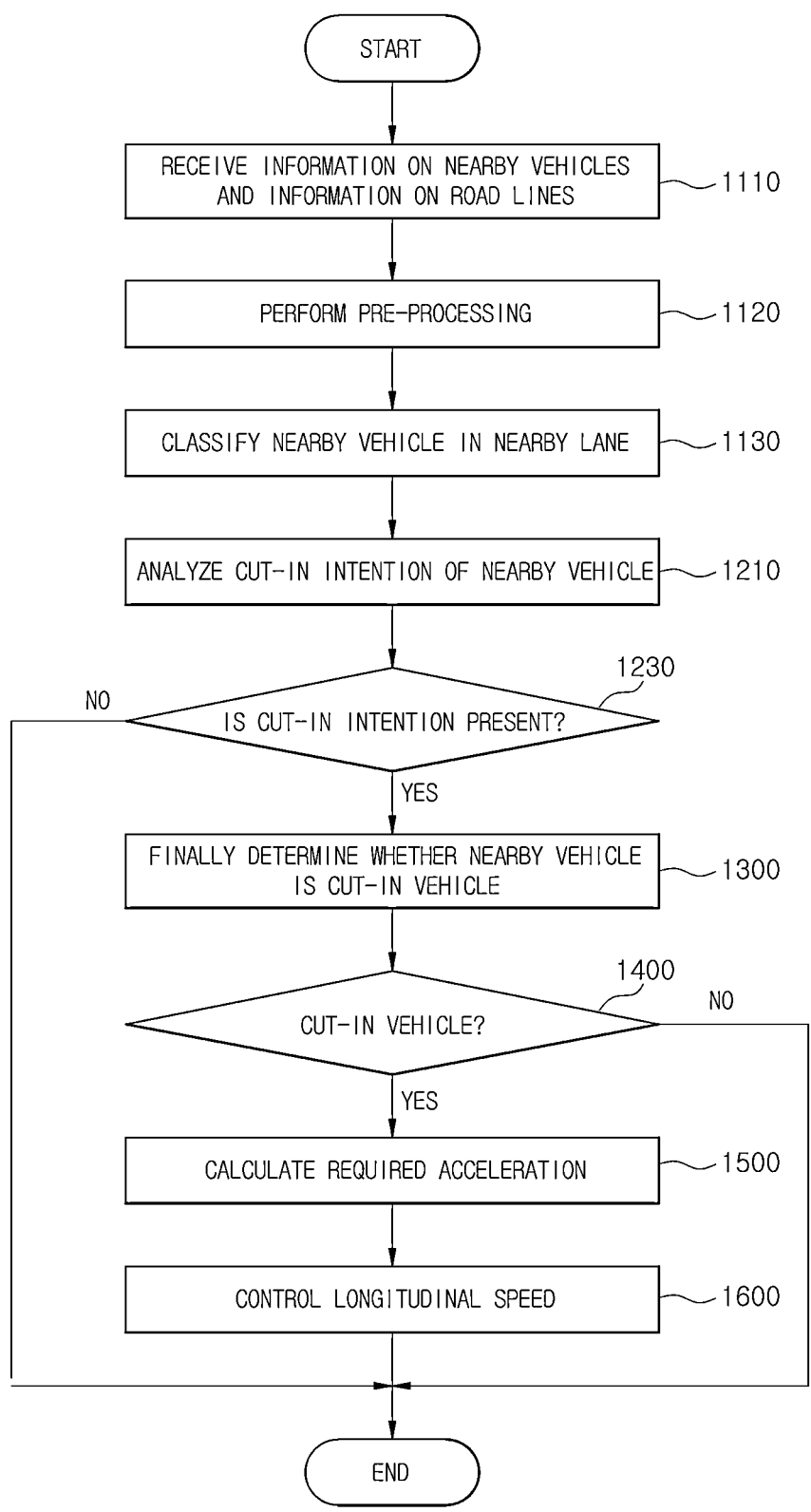
FIG. 7 is a flowchart specifically illustrating the driving assistance method according to one embodiment.
Figure 8:
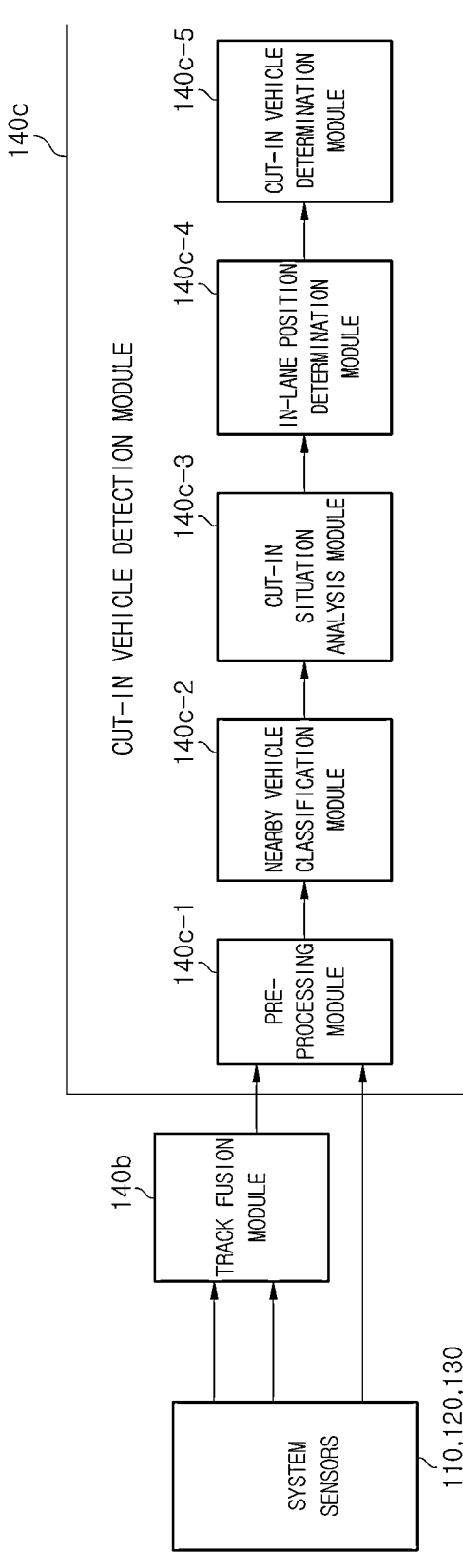
FIG. 8 is a block diagram specifically illustrating an operation of a cut-in vehicle detection module in the driving assistance system according to one embodiment.
Figure 9:
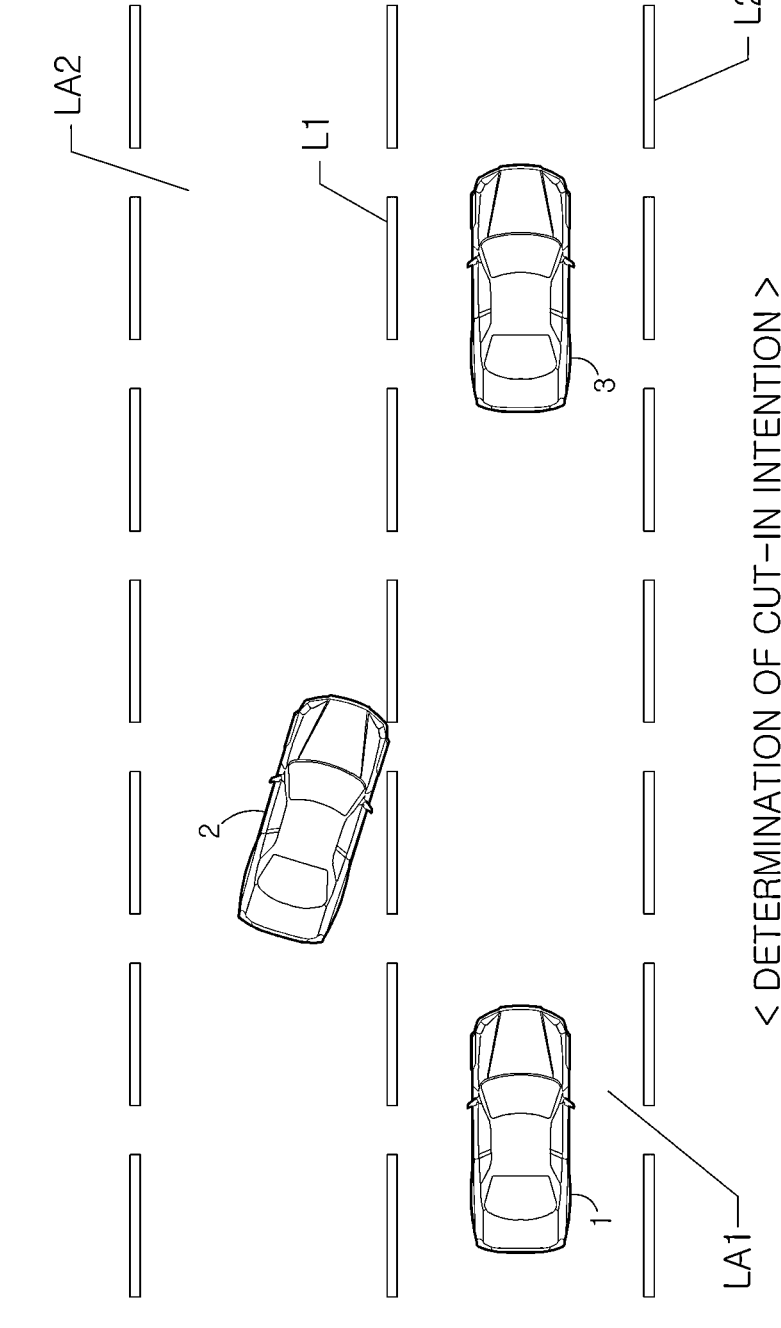
FIG. 9 is a view illustrating an example of a situation determined to be a cut-in intention in the driving assistance method according to one embodiment.
Figure 10:
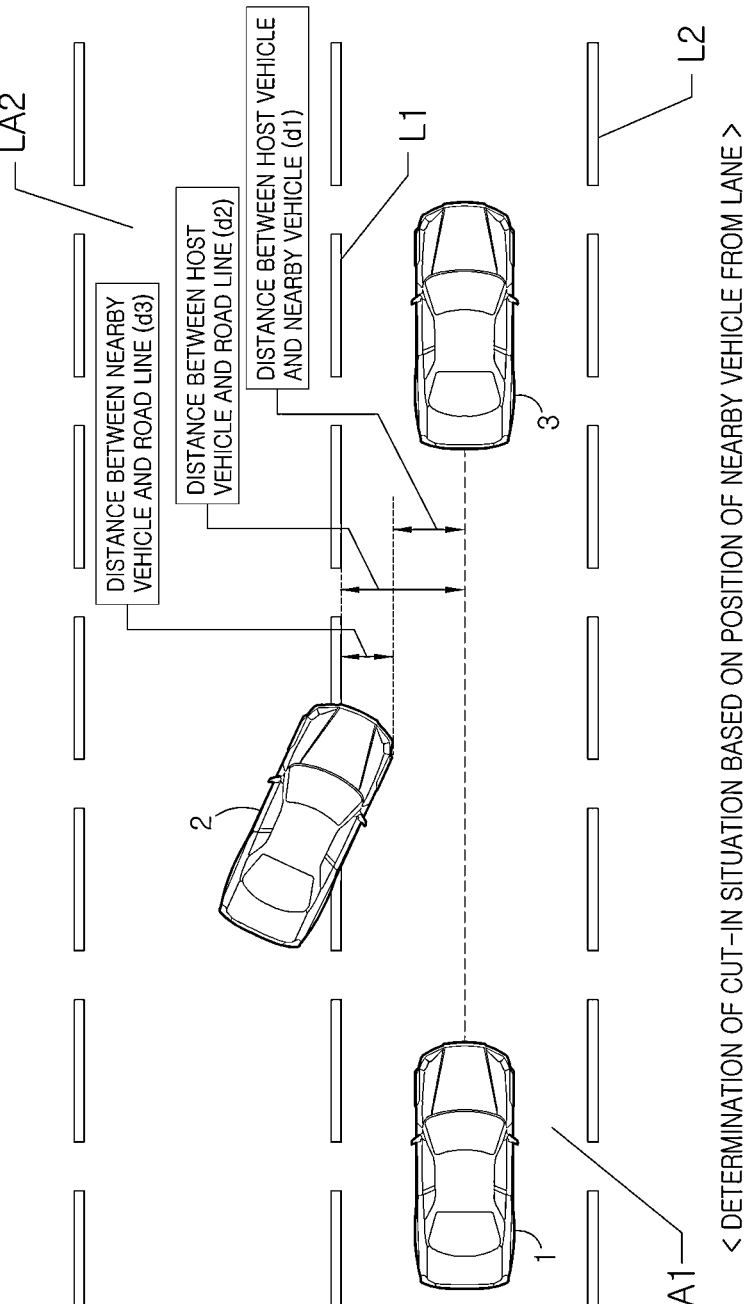
FIG. 10 is a view illustrating an example of a cut-in situation determined by the driving assistance method according to one embodiment.

FIG. 7 is a flowchart specifically illustrating the driving assistance method according to one embodiment, and FIG. 8 is a block diagram specifically illustrating an operation of a cut-in vehicle detection module in the driving assistance system according to one embodiment. FIG. 9 is a view illustrating an example of a situation determined to be a cut-in intention in the driving assistance method according to one embodiment, and FIG. 10 is a view illustrating an example of a cut-in situation determined by the driving assistance method according to one embodiment.

Referring to FIGS. 7 and 8 together, in order to detect the cut-in vehicle, the cut-in vehicle detection module 140c receives the information on the nearby vehicles and the information on the road lines (1110).

In the example, a case in which the system sensors such as the camera 110, the radar 120, or the LiDAR 130 and the track fusion module 140b for fusing the data output from the system sensors provide the information on the nearby vehicles and the information on the road lines to the cut-in vehicle detection module 140c will be described.

A pre-processing module 140c-1 may perform pre-processing on the received information (1120), and a nearby vehicle classification module 140c-2 may classify a nearby vehicle in a nearby lane among the detected nearby vehicles (1130).

As described above, the vehicles near the vehicle 1 may include the preceding vehicle or the following vehicle that is traveling in the same lane as the travel lane LA1 of the vehicle 1 and the vehicle that is traveling in the nearby lane LA2 of the travel lane LA1 of the vehicle 1. The nearby vehicle classification module 140c-2 may classify a vehicle that is traveling in the nearby lane LA2 among the vehicles near the vehicle 1 based on the information on the nearby vehicles and the information on the road lines.

The cut-in situation analysis module 140c-3 may analyze the cut-in intention of the nearby vehicle that is traveling in the nearby lane based on the information on the nearby vehicles and the information on the road lines (1210).

Referring to FIG. 9 together, it may be determined that the cut-in intention of the nearby vehicle 2 is present when a heading angle of the nearby vehicle 2 that is traveling in the nearby lane is directed to the travel lane of the vehicle 1 or the first road line L1, when a transverse position of the nearby vehicle 2 that is traveling in the nearby lane is close to the travel lane of the vehicle 1 or the first road line L1, or based on a transverse speed of the nearby vehicle 2.

When it is determined that the cut-in intention is present (YES in 1230), an in-lane position determination module 140c-4 and a cut-in vehicle determination module 140c-5 may finally determine whether the nearby vehicle 2 is the cut-in vehicle (1300).

The in-lane position determination module 140c-4 may determine the position of the nearby vehicle 2 from the travel lane based on the information on the nearby vehicles and the information on the road lines.

For example, as illustrated in FIG. 10, the in-lane position determination module 140c-4 may calculate the distance d1 between the vehicle 1 and the nearby vehicle 2 and the distance d2 between the vehicle 1 and the first road line L1 based on the information on the nearby vehicles and the information on the road lines.

In addition, when the distance d2 between the vehicle 1 and the first road line L1 is subtracted from the distance d1 between the vehicle 1 and the nearby vehicle 2, the distance d3 between the nearby vehicle 2 and the first road line L1 may be acquired. That is, a relationship of d3=d1−d2 may be established, in which a value of d3 may represent the position of the nearby vehicle 2 from the travel lane.

The cut-in vehicle determination module 140c-5 may determine whether the cut-in situation caused by the nearby vehicle 2 has occurred based on the position of the nearby vehicle 2 from the travel lane. Specifically, the cut-in vehicle determination module 140c-5 may determine that at least a part of the nearby vehicle 2 is positioned from the travel lane when the value of d3 is smaller than a reference value. That is, it may be determined that the cut-in situation caused by the nearby vehicle 2 has occurred. For example, the reference value may be set to zero, and when the value of d3 is a negative (−) value, it may be determined that at least a part of the nearby vehicle 2 is positioned in the travel lane.

When it is finally determined that the cut-in vehicle is present (YES in 1400), a required acceleration for avoiding collision with the cut-in vehicle may be calculated (1500), and a longitudinal speed of the vehicle 1 may be controlled based on the calculated required acceleration (1600).

Specifically, when it is determined that the nearby vehicle 2 is the cut-in vehicle, the target selection module 140d may select the nearby vehicle 2 as a distance control target, and the distance control module 140e may calculate the required acceleration based on a relative speed of the nearby vehicle 2.

As described above, when it is determined whether the nearby vehicle is the cut-in vehicle based on the position of the nearby vehicle from the travel lane, it is possible to quickly detect the cut-in vehicle and improve the stability and reliability of the driving assistance system.

As is apparent from the above description, it is possible to determine whether a nearby vehicle is a cut-in vehicle based on a position of the nearby vehicle from a lane in which a vehicle is traveling, thereby increasing the accuracy of determination of the cut-in vehicle and improving the reliability of a driving assistance system.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driving assistance, the apparatus comprising:
   a memory in which a program for coping with a cut-in vehicle is stored; and
   a processor configured to execute the stored program,
   wherein the processor is configured to:
   acquire information on a nearby vehicle and road lines near a vehicle;
   determine a position of the nearby vehicle from a travel lane of the vehicle based on the information on the nearby vehicle and the information on the road lines;
   determine whether the nearby vehicle is the cut-in vehicle based on the position of the nearby vehicle from the travel lane of the vehicle; and
   control a speed of the vehicle based on a relative speed of the nearby vehicle when it is determined that the nearby vehicle is the cut-in vehicle,
   wherein the processor is configured to
   determine that the nearby vehicle is the cut-in vehicle when a difference between a distance between the vehicle and the nearby vehicle and a distance between a first road line, which is positioned between the nearby vehicle and the vehicle, and the vehicle is smaller than a reference value.

2. The driving assistance system of claim 1, wherein the processor is configured to determine the position of the nearby vehicle based on the distance between the first road line and the vehicle, and the distance between the vehicle and the nearby vehicle.

3. The driving assistance system of claim 1, wherein the processor is configured to determine a cut-in intention of the nearby vehicle based on the information on the nearby vehicle and the information on the road lines.

4. The driving assistance system of claim 3, wherein the processor is configured to determine whether the nearby vehicle is the cut-in vehicle based on the position of the nearby vehicle from the travel lane of the vehicle when it is determined that the cut-in intention of the nearby vehicle is present.

5. The driving assistance system of claim 1, wherein the information on the nearby vehicle comprises at least one of a longitudinal position of the nearby vehicle, a transverse position of the nearby vehicle, a length of the nearby vehicle, a width of the nearby vehicle, or a heading angle of the nearby vehicle.

6. The driving assistance system of claim 1, wherein the information on the road lines comprises at least one of a deviation between a left road line and a right road line centered on the vehicle, a curvature of the lane, or a curvature rate of the lane.

7. The driving assistance system of claim 1, wherein the processor is configured to:
   determine a required acceleration of the vehicle based on the relative speed of the nearby vehicle when it is determined that the nearby vehicle is the cut-in vehicle, and control the speed of the vehicle based on the calculated required acceleration.

8. A apparatus for driving assistance, the apparatus comprising:

a camera provided to detect road lines;

a radar provided to detect a nearby vehicle; and a processor configured to execute a program stored in a memory, wherein the processor is configured to:

acquire information on the nearby vehicle and information on the road lines;

determine a position of the nearby vehicle from a travel lane of a vehicle based on the information on the nearby vehicle and the information on the road lines;

determine whether the nearby vehicle is a cut-in vehicle based on the position of the nearby vehicle from the travel lane of the vehicle; and control a speed of the vehicle based on a relative speed of the nearby vehicle when it is determined that the nearby vehicle is the cut-in vehicle, wherein the processor is configured to determine that the nearby vehicle is the cut-in vehicle when a difference between a distance between the vehicle and the nearby vehicle and a distance between a first road line, which is positioned between the nearby vehicle and the vehicle, and the vehicle is smaller than a reference value.

9. The driving assistance system of claim 8, wherein the processor is configured to determine the position of the nearby vehicle based on the distance between a first road line and the vehicle and a distance between the vehicle and the nearby vehicle.

10. The driving assistance system of claim 8, wherein the processor is configured to determine a cut-in intention of the nearby vehicle based on the information on the nearby vehicle and the information on the road lines.

11. The driving assistance system of claim 10, wherein the processor is configured to determine whether the nearby vehicle is the cut-in vehicle based on the position of the nearby vehicle from the travel lane when it is determined that the cut-in intention of the nearby vehicle is present.

12. The driving assistance system of claim 8, wherein the processor is configured to:

calculate a required acceleration of the vehicle based on the relative speed of the nearby vehicle when it is determined that the nearby vehicle is the cut-in vehicle, and control the speed of the vehicle based on the calculated required acceleration.

13. A method for driving assistance, the method comprising:

acquiring at least one of image data or radar data near a vehicle;

acquiring information on a nearby vehicle and road lines near the vehicle based on the at least one data;

determining a position of the nearby vehicle from a travel lane of the vehicle based on the information on the nearby vehicle and the information on the road lines;

determining whether the nearby vehicle is a cut-in vehicle based on the position of the nearby vehicle from the travel lane of the vehicle; and controlling a speed of the vehicle based on a relative speed of the nearby vehicle when it is determined that the nearby vehicle is the cut-in vehicle, and wherein the determining of whether the nearby vehicle is the cut-in vehicle comprises determining that the nearby vehicle is the cut-in vehicle when a difference between a distance between the vehicle and the nearby vehicle and a distance between a first road line, which is positioned between the nearby vehicle and the vehicle, and the vehicle is smaller than a reference value.

14. The driving assistance method of claim 13, wherein the determining of the position of the nearby vehicle comprises determining the position of the nearby vehicle based on the distance between the first road line, and the vehicle and the distance between the vehicle and the nearby vehicle.

15. The driving assistance method of claim 13, wherein the determining of whether the nearby vehicle is the cut-in vehicle comprises determining a cut-in intention of the nearby vehicle based on the information on the nearby vehicle and the information on the road lines.

16. The driving assistance method of claim 15, wherein the determining of whether the nearby vehicle is the cut-in vehicle comprises determining whether the nearby vehicle is the cut-in vehicle based on the position of the nearby vehicle from the travel lane of the vehicle when it is determined that the cut-in intention of the nearby vehicle is present.

17. The driving assistance method of claim 13, wherein the controlling of the speed of the vehicle comprises:

calculating a required acceleration of the vehicle based on the relative speed of the nearby vehicle when it is determined that the nearby vehicle is the cut-in vehicle; and controlling the speed of the vehicle based on the calculated required acceleration.

* * * * *